G. A. DAMRON.
AUTOMOBILE SIGNAL.
APPLICATION FILED JUNE 28, 1915.
1,183,170.
Patented May 16, 1916.
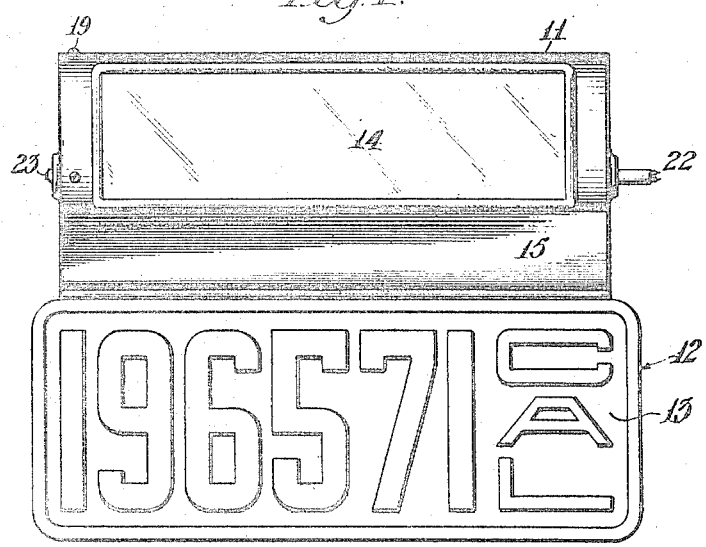
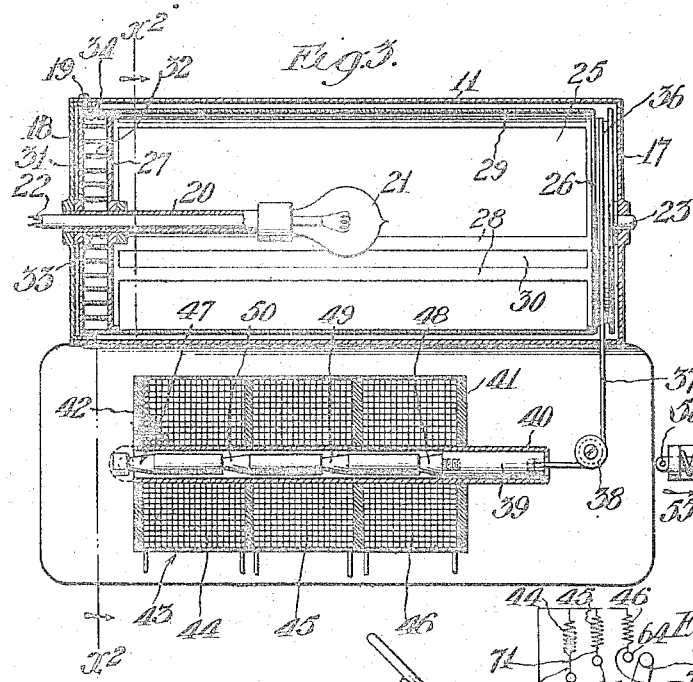
Inventor
George A. Damron
by Townsend, Graham + Hawes
his Attorneys
Witness:
Louis W. Gratz

UNITED STATES PATENT OFFICE.

GEORGE A. DAMRON, OF LOS ANGELES, CALIFORNIA.

AUTOMOBILE-SIGNAL.

1,183,170.    Specification of Letters Patent.    Patented May 16, 1916.

Application filed June 28, 1915. Serial No. 36,883.

*To all whom it may concern:*

Be it known that I, GEORGE A. DAMRON, a citizen of the United States, residing at Los Angeles, in the county of Los Angeles, State of California, have invented a new and useful Automobile-Signal, of which the following is a specification.

My invention relates to automobile signals, and the principal object of the invention is to provide a signal which can be secured to the rear of the automobile, and which can be so actuated as to indicate to a following vehicle any proposed change in the direction of the automobile.

A further object of the invention is to provide such a signal which may be substituted for an ordinary tail light, and serve all the purposes of a tail light.

A further object of the invention is to provide an illuminated automobile signal in which the light also serves to illuminate the license plate, making a separate light for this purpose unnecessary.

A further object of the invention is to provide a signal which can be manually set to indicate a change in the direction of the automobile, in combination with means for releasing this signal whenever this change in direction takes place.

A further object of the invention is to provide electric means by which the signal may be set, thus doing away with the necessity for complicated rods, chains, or wire systems for operating the signal.

Referring to the drawings, which are for illustrative purposes only: Figure 1 is a view of the signal when used as a tail light as seen in place on the rear of an automobile. Fig. 2 is a section on the planes $x^2$—$x^2$ of Figs. 1, and 3. Fig. 3 is a section on the plane $x^3$—$x^3$ of Fig. 2. Fig. 4 is a diagrammatic view of the signal and the release means therefor as applied to an automobile. Fig. 5 is a diagram of connections.

In the form of my invention illustrated in the drawings, an outer shell 11 is provided, this shell having a downwardly extending apron 12 on which is secured a license plate 13. Set in the shell 11 is a curved window 14 of clear glass, the shell below the member 14 being flared out to form a hood 15, having a reflecting surface 16 on the lower side thereof. The shell 11 is provided with a fixed end 17, and a removable end 18, which is secured in the shell 11 by means of screws 19. Secured in the end 18 is a tube 20 which extends through to the inside of the signal, carrying an incandescent lamp 21, suitable wires 22 being carried through the tube 20 to the lamp 21. Pivoted on the tube 20 and on a pivot pin 23 is a rotor 25. This rotor consists of metal ends 26 and 27 secured together by suitable metal members 28. A plurality of colored glass members 29, and clear glass members 30, are secured between the metal members 28 as shown in Fig. 2. An additional member 31 is also secured to the members 28, a space being left between the member 31 and the member 27 for a spiral spring 32, this spring being secured at 33 to the tube 20, and at 34 to one of the members 28. This spring is so placed that it tends to move the rotor 25 in the direction of the arrow 35 shown in Fig. 2. Secured on the end 26 is a sheave 36, this sheave having a flexible cord or wire 37 secured thereon. The wire 37 passes through an opening in the shell 11 and from thence downwardly over an idler pulley 38 carried on the apron 12. The wire 37 is secured to a magnetic core 39, this core sliding freely in a tube 40, carried in heads 41 and 42 of an operating magnet 43. The operating magnet 43 has three coils 44, 45, and 46. Secured in the core 39 is a non-magnetic member 47, this member having notches 48, 49, and 50 cut therein. Secured on the side of the head 42 is a bracket 51 in which a latch pin 52 slides, this latch pin having a collar 53 formed thereon, a compression spring 54 surrounding the pin 52, pressing on the collar 53 so that the latch pin 52 is forced inwardly in the direction of the arrow 55 shown in Fig. 2. The end of the latch pin is so located that it presses against the non-magnetic member 47 engaging the notches 48, 49, and 50, as will hereafter be explained.

Secured in an opening 56 in the end of the latch pin 52 is a flexible cord 57 which extends forwardly passing over an idler pulley 58 and being secured to the steering lever 59, this lever being moved in the direction of the arrows 60 by a steering wheel 61 through a worm gear in the manner now in common use of automobiles.

Any convenient form of switch 62 may be provided, this switch consisting of a movable arm 63, engaging the contacts 64, 65, and 66. This switch may be located on the steering column. The center of the lever 63 is connected through a wire 67 to a battery 68, the other terminal of the battery being connected through a wire 69 with one end of the coils 44, 45, and 46, the coils 44, 45, and 46 being connected in parallel the wires 70, 71, and 72, connecting the ends of these coils with the contacts 64, 65, and 66, as shown in Fig. 5. The transparent members 29 are provided with suitable markings such as arrows, or words, "Right", "Left", and "Stop". Whenever the operator of the vehicle wishes to give notice to a following vehicle of his intention to turn or stop he actuates the arm 63, making contacts suitably with the contacts 64, 65, and 66. When the connection is made with the contact 64, the coil 46 is energized, the core 39 being pulled into the coil 43 so that the latch pin 52 drops into and engages the notch 50 on the member 47. This movement of the core 39 is transmitted through the wire 37 to the sheave 36, the rotor 25 being turned through approximately 90°. In its off position the rotor 25 presents a practically blank red glass member 29 behind the glass window 14, so that the light 21 simply shows as a red light through the glass window 14, the indication being that of an ordinary tail light, at the same time light shines through one of the plain glass members 30 onto the reflecting surface 16 formed on the hood 15, this light being reflected downwardly onto the license plate 13, illuminating same.

When the rotor 25 is turned 90° from its original position a new member 29 is swung around behind the member 14, this new member 29 may have the legend "Right", "Left", or "Stop", marked thereon. In practice one of the members 29 consists of a plain red glass, the other three members consisting of plain red glass, with a transparent legend, "Stop", "Right", "Left", marked thereon.

Whenever it is desired to indicate other signals the lever 63 is moved around to the contact 65 on the contact 66, thus pulling the core 39 farther into the coil 43, the core 39 being held in each of these positions by the latch pin 52, engaging one of the notches 48, 49, or 50, in the member 47. It is thus possible for the operator of the vehicle by suitable actuation of the switch 52 to move the rotor 25 so that a suitable illuminated legend appears behind the glass number 14, a plurality of transparent members 30 being provided so that the license plate 13 is illuminated in any position of the rotor. As soon as the operator of the vehicle has caused this indication he throws the switch 62 to the off position, the signal then remaining at its proper setting. The signal then remains at this setting until the steering wheel 61 is turned. The turning of the steering wheel 61 moves the lever 59 from the central position shown in Fig. 4 in the direction of one of the arrows 60. The pulley 58 being considerably below the axis of the lever 59, any movement of the lever 59 tends to pull on the wire 57, thus pulling the latch pin 52 out of engagement with the particular notches 48, 49, or 50, with which it is engaged, and allowing the core 39 to be pulled back to its initial position by the spring 32. The signal therefore stays in its indicating position until the vehicle is turned, it being then released and returned to its initial positon.

I claim as my invention:

1. An automobile signal comprising a rotor having a plurality of indicating markings thereon, electrical means for turning this rotor to display one of the markings, latch means for restraining the rotor in the set position, a flexible connection secured to said latch means, and means by which the turning of the steering mechanism of the automobile pulls on said connection and releases said latch means.

2. An automobile signal comprising a rotor having a plurality of indicating markings thereon, electrical means for turning this rotor to display one of the markings, latch means for restraining the rotor in the set position, a flexible connection secured to said latch means, and means by which the turning of the steering mechanism of the automobile in either direction pulls on said connection and releases said latch means.

3. An automobile signal comprising a rotor having a plurality of indicating markings thereon, a solenoid having a plurality of windings, a core of magnetic material adapted to be pulled into the solenoid, means for connecting said core to said rotor, latch means for restraining said core so that said rotor displays one of said indicating markings, a flexible connection secured to said latch means, and means by which the turning of the steering mechanism of the automobile in either direction pulls on said connection and releases said latch means.

In testimony whereof, I have hereunto set my hand at Los Angeles, California, this 21 day of June, 1915.

GEORGE A. DAMRON.